Oct. 10, 1933.  J. DAWSON, JR  1,929,839
BELTING SUITABLE FOR DRIVING MACHINES
Filed May 16, 1932
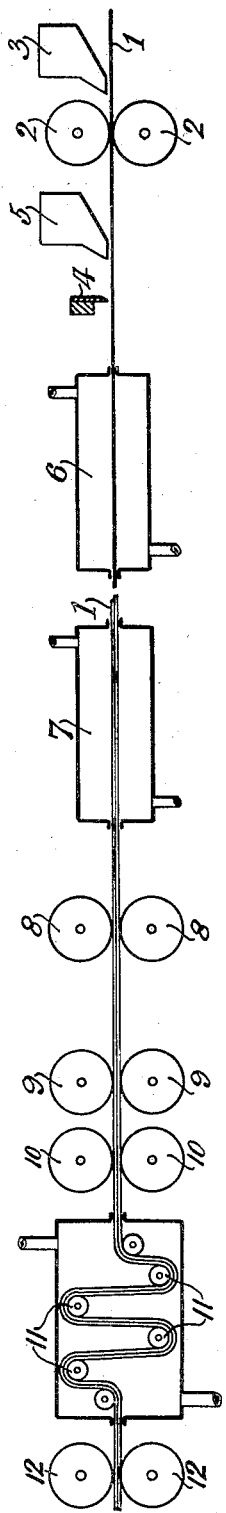

Patented Oct. 10, 1933

1,929,839

UNITED STATES PATENT OFFICE 1,929,839

BELTING SUITABLE FOR DRIVING MACHINES

James Dawson, Jr., Lincoln, England, assignor to James Dawson & Son Limited, Lincoln, England Application May 16, 1932, Serial No. 611,720, and in Great Britain August 13, 1931

18 Claims. (Cl. 154—4)

This invention relates to a process of manufacture of belting suitable for driving machines, and commonly known as "friction surface rubber belting".

The object of the present invention is to produce a friction surface rubber belt having improved breaking stress, increased resistance to stretch, greater friction or adhesion between the plies in a multi-ply belt, and improved flexibility and wearing qualities.

In carrying out the invention, cotton duck or other suitable material is impregnated with rubber latex or revertex, with which are compounded the usual vulcanizing agents and fillers.

Impregnation of the cotton duck is effected by passing it between rollers, the latex or revertex mix in aqueous dispersion being placed on the duck before it enters the rolls. After passing through the rolls, the partially impregnated duck passes under a spreading knife or doctor, where a further quantity of latex or revertex in aqueous dispersion is spread on. The duck is then passed through warm air where a proportion of the water of the dispersion is dried out, and apparent coagulation of the rubber in the mixture takes place. After the duck has been treated in this manner on one side it is turned over and similarly treated on the other side.

The impregnated duck, after being cut and marked in the usual manner, is folded ply upon ply and raised to such a temperature by any suitable method that the spread surfaces of the duck are brought to such a condition that, after passing the whole through rolls, satisfactory adhesion between the plies of the belt is effected. We have found that a temperature of 180° F. to 200° F. is suitable for effecting this.

The belting made up in the manner set out above is then calendered and stretched by passing through calenders having differential rolls driven at different circumferential speeds.

Vulcanization is next carried out by slowly passing the belts or rolls of belting over rollers and under tension through air at vulcanizing temperature, a value of this temperature which has been found satisfactory being 280° F.

This continuous vulcanization in hot air and the elimination of the use of an hydraulic press results in a great increase in the speed of production, and a much greater output from the same space in the same time as compared with the usual method of manufacture. Moreover owing to the greatly reduced cost of the plant required and to the resulting reduced amount of labour necessary, the belt can be produced at a much lower cost than by the methods heretofore commonly employed.

An arrangement of apparatus for carrying out the invention is shown in the accompanying diagrammatic drawing in which 1 represents the cotton duck, 2 the rollers for impregnating the duck with the latex or revertex in aqueous dispersion fed from a container 3 on to the duck, 4 the spreading knife or doctor which spreads a further supply of latex or revertex in aqueous dispersion and fed from a container 5 and 6 is a chamber which is supplied with warm air to dry out a proportion of the water of the dispersion. One side of the duck having thus been treated, it is turned over and the other side similarly treated. The impregnated duck, having been cut and marked and folded ply upon ply is then passed through a chamber 7 heated as by means of hot air for example to a temperature of 180—200° F. to bring the surfaces of the duck to a condition such that when the duck is passed through rolls 8 adhesion between the plies is obtained. The belting thus formed is then passed between rolls 9, 9 and 10, 10 of which the rolls 10, 10 are driven at greater circumferential speeds so that the belting is calendered and stretched.

The belting is finally vulcanized by being passed continuously over rolls 11 arranged as shown in the drawing in a chamber heated to a vulcanizing temperature say 280° F. and is placed under tension by rolls 12. The pressure on the belting, due to its being passed over the rolls 11 and under tension, provides improved adhesion between the plies.

It is to be understood that the term "latex" or "revertex" employed in the appended claims is intended to include latex or revertex compounded with the usual vulcanizing agents and fillers.

What I claim is:—

1. The process of manufacturing friction surface rubber belting which consists in impregnating a foundation material of the nature of cotton duck with rubber latex or revertex in aqueous dispersion and compounded with vulcanizing agents and fillers, subjecting the impregnated material to heat to dry out a portion of the water of the dispersion, arranging the material in ply formation, subjecting the material to further heat and to pressure to obtain adhesion between the plies, calendering and stretching the material, and subjecting the material to a vulcanizing process.

2. The process of manufacturing friction surface rubber belting which consists in impregnating a foundation material of the nature of cotton duck with rubber latex or revertex in aqueous dispersion, subjecting the impregnated material to heat to dry out a portion of the water of the dispersion, arranging the material in ply formation, subjecting the material to further heat and to pressure to obtain adhesion between the plies, and subjecting the material to a continuous vulcanizing process.

3. The process of manufacturing friction surface rubber belting which consists in impregnating a foundation material of the nature of cotton duck with rubber latex or revertex in aqueous dispersion, subjecting the impregnated material to heat to dry out a portion of the water of the dispersion, arranging the material in ply formation subjecting the material to further heat and to pressure to obtain adhesion between the plies, calendering and stretching the material, and subjecting the material to a continuous vulcanizing process.

4. The process of manufacturing friction surface rubber belting which consists in impregnating a foundation material of the nature of cotton duck with rubber latex or revertex in aqueous dispersion, subjecting the impregnated material to heat to dry out a portion of the water of the dispersion, arranging the material in ply formation, subjecting the material to further heat and to pressure to obtain adhesion between the plies, and subjecting the material to a continuous vulcanizing process which consists in passing the material under tension through air maintained at vulcanizing temperature.

5. The process of manufacturing friction surface rubber belting which consists in impregnating a foundation material of the nature of cotton duck with rubber latex or revertex in aqueous dispersion, subjecting the impregnated material to heat to dry out a portion of the water of the dispersion, arranging the material in ply formation, subjecting the material to further heat and to pressure to obtain adhesion between the plies, calendering and stretching the material, and subjecting the material to a continuous vulcanizing process, which consists in passing the material under tension through air maintained at vulcanizing temperature.

6. Apparatus for the manufacture of friction surface rubber belting comprising rollers between which is passed a foundation material of the nature of cotton duck to which has been supplied rubber latex or revertex in aqueous dispersion, the rollers impregnating the material with the dispersion, a spreading member to which the material passes and which spreads a further quantity of dispersion deposited upon the material, means for maintaining a heated air zone to which the material passes to dry out a portion of the water of the dispersion, whereafter the material is arranged in ply formation, means for thereafter heating and rolling the material to effect adhesion between the plies, further rollers, means for maintaining a zone including the further rollers at a vulcanizing temperature, and means for continuously passing the material under tension and over the said further rollers to effect vulcanization.

7. Apparatus for the manufacture of friction surface rubber belting comprising rollers between which is passed a foundation material of the nature of cotton duck to which has been supplied rubber latex or revertex in aqueous dispersion, the rollers impregnating the material with the dispersion, a spreading member to which the material passes and which spreads a further quantity of dispersion deposited upon the material, means for maintaining a heated air zone to which the material passes to dry out a portion of the water of the dispersion, whereafter the material is arranged in ply formation, means for thereafter heating and rolling the material to effect adhesion between the plies, rolls and means for driving the rolls at different circumferential speeds to effect calendering and stretching of the folded material, further rollers, means for maintaining a zone including the further rollers at a vulcanizing temperature, and means for continuously passing the material under tension and over the said further rollers to effect vulcanization.

8. The process of manufacturing friction surface rubber belting which consists in impregnating a foundation material of the nature of cotton duck with rubber latex or revertex in aqueous dispersion, the impregnation being effected in two stages in the first of which a quantity of dispersion is fed to the material and subjected to a rolling action and in the second of which an additional quantity of dispersion is fed to the material and subjected to the spreading action of a spreading knife or doctor blade.

9. The process of manufacturing friction surface rubber belting which consists in impregnating a foundation material of the nature of cotton duck with rubber latex or revertex in aqueous dispersion, the impregnation being effected in two stages in the first of which a quantity of dispersion is fed to the material and subjected to a rolling action and in the second of which an additional quantity of dispersion is fed to the material and subjected to the spreading action of a spreading knife or doctor blade, subjecting the material to heat to dry out a portion only of the water of dispersion, arranging the material in ply formation, and then subjecting the plied material to further heat and to pressure to obtain adhesion between the plies.

10. The process of manufacturing friction surface rubber belting which consists in impregnating a foundation material of the nature of cotton duck with rubber latex or revertex in aqueous dispersion, the impregnation being effected in two stages in the first of which a quantity of dispersion is fed to the material and subjected to a rolling action and in the second of which an additional quantity of dispersion is fed to the material and subjected to the spreading action of a spreading knife or doctor blade, and subjecting the material to a continuous vulcanizing treatment.

11. The process of manufacturing friction surface rubber belting which consists in impregnating a foundation material of the nature of cotton duck with rubber latex or revertex in aqueous dispersion, the impregnation being effected in two stages in the first of which a quantity of dispersion is fed to the material and subjected to a rolling action and in the second of which an additional quantity of dispersion is fed to the material and subjected to the spreading action of a spreading knife or doctor blade, subjecting the material to heat to dry out a portion only of the water of dispersion, arranging the material in ply formation, then subjecting the plied material to further heat and to pressure to obtain adhesion between the plies, and subjecting the material to a continuous vulcanizing treatment.

12. The process of manufacturing friction surface rubber belting which consists in impregnating a foundation material of the nature of cotton duck with rubber latex or revertex in aqueous dispersion, the impregnation being effected in two stages in the first of which a quantity of dispersion is fed to the material and subjected to a rolling action and in the second of which an additional quantity of dispersion is fed to the material and subjected to the spreading action of a spreading knife or doctor blade, and subjecting the material to a continuous vulcanizing treatment by placing the material under tension and passing it through air maintained at vulcanizing temperature.

13. The process of manufacturing friction surface rubber belting which consists in impregnating a foundation material of the nature of cotton duck with rubber latex or revertex in aqueous dispersion, the impregnation being effected in two stages in the first of which a quantity of dispersion is fed to the material and subjected to a rolling action and in the second of which an additional quantity of dispersion is fed to the material and subjected to the spreading action of a spreading knife or doctor blade, subjecting the material to heat to dry out a portion only of the water of dispersion, arranging the material in ply formation, then subjecting the plied material to further heat and to pressure to obtain adhesion between the plies, and subjecting the material to a continuous vulcanizing treatment by placing the material under tension and passing it through air maintained at vulcanizing temperature.

14. The process of manufacturing friction surface rubber belting which consists in impregnating a foundation material of the nature of cotton duck with rubber latex or revertex in aqueous dispersion, the impregnation being effected in two stages in the first of which a quantity of dispersion is fed to the material and subjected to a rolling action and in the second of which an additional quantity of dispersion is fed to the material and subjected to the spreading action of a spreading knife or doctor blade, calendering and stretching the material, and subjecting the material to a continuous vulcanizing treatment.

15. The process of manufacturing friction surface rubber belting which consists in impregnating a foundation material of the nature of cotton duck with rubber latex or revertex in aqueous dispersion, the impregnation being effected in two stages in the first of which a quantity of dispersion is fed to the material and subjected to a rolling action and in the second of which an additional quantity of dispersion is fed to the material and subjected to the spreading action of a spreading knife or doctor blade, subjecting the material to heat to dry out a portion only of the water of dispersion, arranging the material in ply formation, then subjecting the plied material to further heat and to pressure to obtain adhesion between the plies, calendering and stretching the material, and subjecting the material to a continuous vulcanizing treatment.

16. The process of manufacturing friction surface rubber belting which consists in impregnating a foundation material of the nature of cotton duck with rubber latex or revertex in aqueous dispersion, the impregnation being effected in two stages in the first of which a quantity of dispersion is fed to the material and subjected to a rolling action and in the second of which an additional quantity of dispersion is fed to the material and subjected to the spreading action of a spreading knife or doctor blade, subjecting the material to heat to dry out a portion only of the water of dispersion, arranging the material in ply formation, then subjecting the plied material to further heat and to pressure to obtain adhesion between the plies, calendering and stretching the material, and subjecting the material to a continuous vulcanizing treatment by placing the material under tension and passing it through air maintained at vulcanizing temperature.

17. For use in impregnating material such as cotton duck with rubber latex or revertex in aqueous dispersion, apparatus comprising rollers, means for feeding dispersion to the duck before it passes to the rollers which latter spread the dispersion, a spreading knife, means for feeding a second quantity of dispersion to the duck before it passes to the knife which latter spreads the second quantity of dispersion, a chamber through which the impregnated duck is caused to move, means for heating the chamber to dry out a portion of the water of dispersion to enable adhesion to take place between the material when arranged in ply formation, a second chamber to which the impregnated and plied material is passed, means for heating the chamber to vulcanizing temperature, and means for placing the material under tension and causing the material to pass continuously through the second chamber.

18. For use in impregnating material such as cotton duck with rubber latex or revertex in aqueous dispersion, apparatus comprising rollers, means for feeding dispersion to the duck before it passes to the rollers which latter spread the dispersion, a spreading knife, means for feeding a second quantity of dispersion to the duck before it passes to the knife which latter spreads the second quantity of dispersion, a chamber through which the impregnated duck is caused to move, means for heating the chamber to dry out a portion of the water of dispersion to enable adhesion to take place between the material when arranged in ply formation, additional rolls to which the impregnated and plied material is passed, means for driving the rolls at different speeds to effect calendering of the material, a second chamber to which the impregnated and plied material is passed, means for heating the chamber to vulcanizing temperature, and means for placing the material under tension and causing the material to pass continuously through the second chamber.

JAMES DAWSON, Jr.